United States Patent [19]

Kovalovsky

[11] Patent Number: 4,461,435

[45] Date of Patent: Jul. 24, 1984

[54] FISHING REEL

[76] Inventor: Oscar Kovalovsky, 11154 Debby St., North Hollywood, Calif. 91606

[21] Appl. No.: 393,455

[22] Filed: Jun. 29, 1982

[51] Int. Cl.³ .............................................. A01K 89/02
[52] U.S. Cl. .............................. 242/214; 242/84.51 R; 242/215; 242/218
[58] Field of Search .................. 242/84.5 R, 84.51 R, 242/84.1 R, 211, 212, 213, 214, 216, 217, 215, 218; 254/376, 378; 192/12 B, 14

[56] References Cited

U.S. PATENT DOCUMENTS

| 1,077,461 | 11/1913 | Dutcher | 242/217 |
| 1,284,039 | 11/1918 | Atwood | 242/84.51 R |
| 2,009,356 | 7/1935 | De Seversky | 242/215 |
| 2,489,457 | 11/1949 | Maerk | 242/218 |
| 2,548,317 | 4/1951 | MacBlane | 242/212 |
| 2,765,990 | 10/1956 | Engel | 242/216 |
| 3,490,714 | 1/1970 | Underwood et al. | 242/216 |
| 4,352,474 | 10/1982 | Kovalousky | 242/218 |

FOREIGN PATENT DOCUMENTS

| 1993 | of 1893 | United Kingdom | 242/84.5 R |
| 618743 | 2/1949 | United Kingdom | 242/220 |

Primary Examiner—Stuart S. Levy
Assistant Examiner—Thomas R. Hannon
Attorney, Agent, or Firm—Roger A. Marrs

[57] ABSTRACT

A fishing reel is disclosed herein having a supporting frame provided with a stub shaft on which a sleeved and knobbed crank plate is rotatably mounted. A fishing line storage spool is carried on the sleeve of the crank plate by a pair of spaced apart ball bearing assemblies. A drive latch is carried on the crank plate for selective disposition into engagement with one of several drive lugs projecting from the side of the spool adjacent to the crank plate in order to achieve non-slip, positive drive. A disconnect mechanism is operably carried between the crank plate and the frame for disengaging the drive latch from the spool lugs via a release blade and which includes a timing mechanism carried on the crank plate sleeve cooperating with a pawl carried on the frame. The disconnect mechanism automatically operates when the fishing line pull rotates the spool counterclockwise to positive drive rotation so that the fishing line tension is applied only by the drag adjuster assembly carried on the crank plate and bearing against the side of the spool. The reel drag adjuster assembly supplies spool drag for tensioning the line during fishing line pull.

7 Claims, 15 Drawing Figures

FISHING REEL

BACKGROUND OF THE INVENTION

1. Field of the Invention

The present invention relates to the field of fishing reels and more particularly to a novel fishing reel having non-slip, positive drive which incorporates an adjustable drag system by which a fish must exert its energy there against while at the same time, a crank or winding of the spool does not revolve in the opposite direction to the retrieve rotation more than one complete revolution when the fish overpowers the user's grip on the winding crank or knob.

2. Brief Description of the Prior Arts

In the past, prior fishing reels have been designed, without any drag systems, with just frictional devices incorporating a spring loaded pawl sliding over a series of geared teeth and various designs of other frictional devices which retard an out-going spool of fish line at an adjustable rate of friction.

Such prior fishing reels have been made with either the winding knob or crank fastened directly to the spool itself so that when the fish pulls the line from the spool, the winding knob or crank rotates with the spool regardless of what type of retardation system is employed.

Another system is known as the slip-clutch type and such a fishing reel is designed with an adjustable friction control device; however, the winding knob is ratcheted to rotate only in the wind-in direction. When the fish pulls the line from the spool, the winding knob or crank is stationary.

Both of the above systems have problems and difficulties. The aforementioned fishing reel having the winding knob or crank that rotates in a reverse direction upon the fish pulling on the line from the spool has the advantage of applying more wind-in power than what the drag adjuster is set at; however, when the fish overpowers the user'finger grip on the winding knob, then two disadvantages occur. If the fingers are not released immediately, to allow the fish to make his getaway run, there is the chance that either line breakage or a further along failure of the leader, hooks, etc., will occur. Also, as the fingers are released from the winding knob or crank, the knob or crank rotates in the reverse direction. The speed of rotation can exceed several thousand per minute and under considerable force. This means that the user must be aware not to attempt to stop the movement since severe injury will result.

The other prior fishing reel of the slip-clutch type employs the winding knob so that it does not rotate upon the fish pulling line from the spool and has the advantage that it is a much safer reel to use. However, for a larger fish in the range of 100 pounds or more, and using a certain class weight of line or leader for either tournament prize contest or trying for a world record catch, the slip-clutch is at a disadvantage. In order to preserve the delicate line or leader from breaking, the drag must be set somewhat under the tested breaking limit of the aforementioned line, leader, etc. This limits how much winding force can be exerted against the fish as the fish is lying dormant or is willingly led along toward his captor. Therefore, more drag must be adjusted to the friction device to allow additional winding power to occur. However, should the fish suddenly decide to head elsewhere with the additional drag application and the user is not quick to release that added drag, line or leader breakage can easily result.

Therefore, a long standing need has existed to provide a means whereby the retrieving of fishing line that is being held taut by a sizeable fish can be accomplished in a non-slip, positive manner while incorporating an adjustable drag system against which the fish must exert its energy. However, at the same time, the crank or winding knob on the reel must not revolve in the opposite direction to the retrieve rotation more than one complete revolution when the fish overpowers the user's grip on the winding knob. By such a means, the advantages of both the aforementioned type of fishing reel is obtained without the attendant problems or difficulties.

SUMMARY OF THE INVENTION

Accordingly, the above problems and difficulties are obviated by the present invention which provides a novel fishing reel having a fishing line storage spool rotatably carried on a sleeve of a crank plate which is rotatably mounted on a stub shaft projecting from a supporting frame. Direct drive means are operably provided between the crank plate and the spool for selectively driving the spool in a direct and positive manner and disconnect means are operably connected between the frame, spool and crank plate for automatically releasing the direct drive means to permit play out of fishing line from the reel. Drag adjuster means are operably carried between the crank plate and the spool for tensioning the fishing line during the play out of the line when the disconnect means have operated to release the direct drive means.

In one form of the invention, the direct drive means includes a drive latch which moves in and out of engagement with drive lugs carried on the side of the spool while phe disconnect means includes a timing mechanism for delaying the release of the positive drive means until such time as the spool is free to rotate without interference or jamming.

Therefore, it is among the primary objects of the present invention to provide a novel fishing reel offering the angler an option to select slip-clutch control of the line storage spool or provide a positive drive therefore.

Still another object of the present invention is to provide a novel fishing reel providing a means whereby the retrieving of the fishing line which is being held taut by a captured fish can be achieved in a non-slip, positive manner and yet incorporating an adjustable drag system against which the fish must exert its energy while at the same time, the crank or winding knob does not revolve in the opposite direction to the retrieve rotation more than one complete revolution when the captured fish overpowers the angler's grip on the winding knob.

Yet another object of the present invention is to provide a novel fishing reel employing a lighter drag which can be adjusted then the breaking strength of either the line, leader, hooks or the like is rated but when applicable, the wind-in power of the spool can be positive, without any slippage. Furthermore, should the fish decide to run away from the angler, the winding knob, being locked to the spool, reverses direction, but not more than one complete revolution until a disconnecting mechanism automatically releases the winding knob from the spool. Thus, the novel fishing reel prevents any breakage of the line as the fish runs against the pre-set drag which would be set under the breaking limit of the line.

Still a further object of the present invention is to provide a novel fishing reel wherein the winding knob remains stationary while a captured fish is taking line from the spool so that the tension of an adjustable drag system may be easily and quickly controlled. Control includes manipulation to increase or decrease the tension to suit conditions without the danger of a fast and forcible winding knob injuring the user's hand.

Still another object of the present invention is to provide a novel fishing reel having the advantage that no provision for counter balancing its weight is necessary to provide for a vibrationless, smooth, high speed rotation of the spool since the winding knob or crank cannot revolve in a reverse direction more than one revolution.

Still a further object of the present invention is to provide a novel fishing reel incorporating provisions whereby turning a switch by the user can select either a positive wind movement or a slip type of reel and therefore incorporates the advantages of either a conventional slipclutch type of reel or a conventional positive wind reel without the attendant disadvantages of the conventional reels.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figures 1, 2, 13, 14:
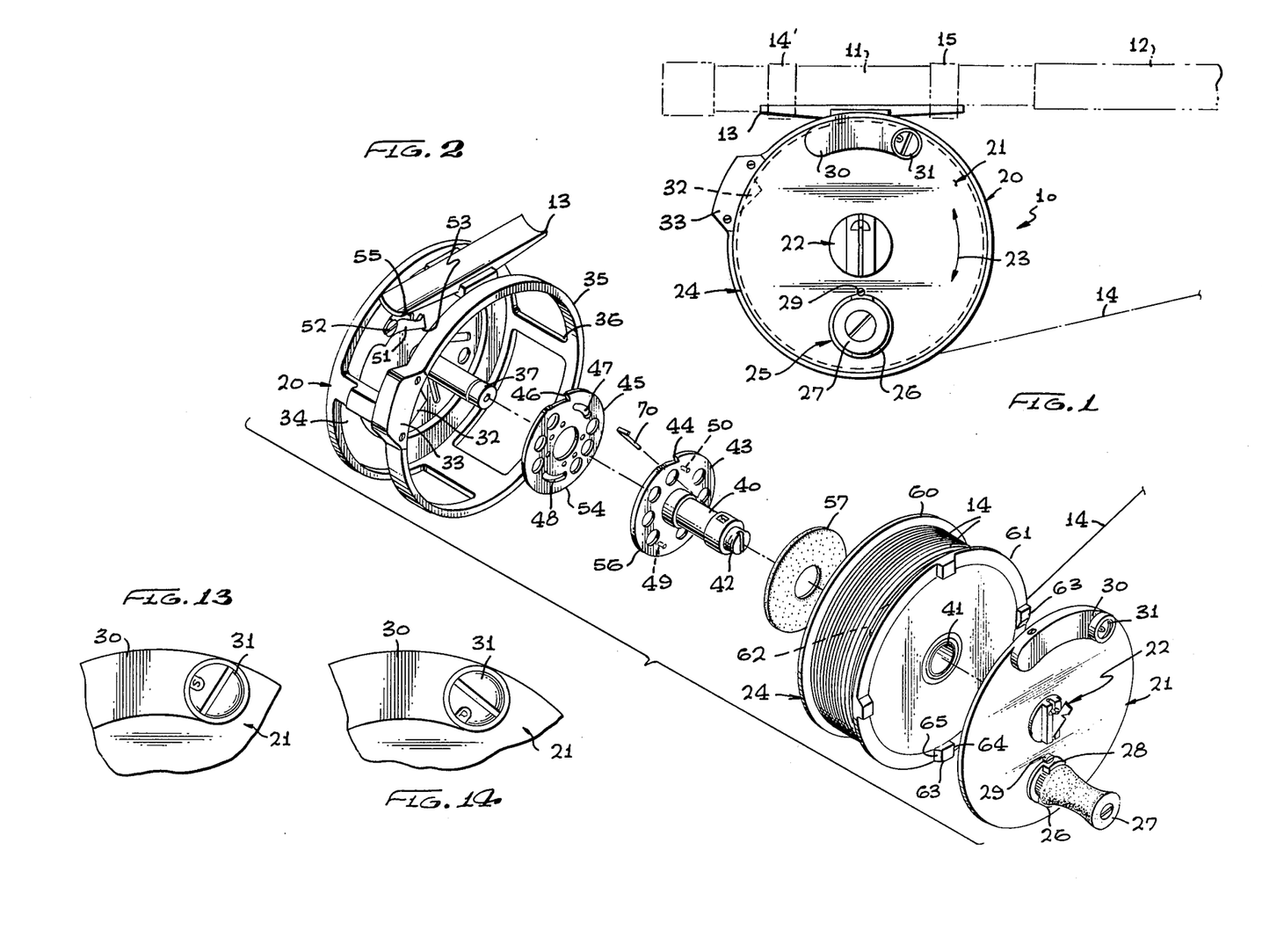
FIG. 1 is a side elevational view of the novel fishing reel carried on a fishing rod.
FIG. 2 is an exploded, perspective view of the novel fishing reel shown in FIG. 1 illustrating the components thereof.
FIGS. 13 and 14 are side elevational views of the direct drive control.

Referring to FIG. 1, the novel fishing reel of the present invention is illustrated in the general direction of arrow 10 where like reference numerals refer to like parts in the different figures of the drawing. The fishing reel 10 is illustrated in a conventional operational manner as being downwardly depending in a detachable arrangement with the butt or handle portion 11 of a fishing rod 12. Also, as is convention, a fishing line 14 is illustrated extending from its storage position on the reel 10 and outwardly extending through a series of guides (not shown) carried along the length of the rod 12. For mounting purposes, the fishing reel 10 includes a base 13 which is releasably clamped onto the handle 11 by means of suitable clamps 14' and 15 which are of conventional design.

The fishing reel 10 includes a frame 20 which carries the base 13 and houses the various components of the reel which includes a crank plate 21 that is maintained in place by a security locking mechanism indicated in general by the numeral 22. Such a locking mechanism is more clearly described in detail in copending application having Ser. No. 229,937 filed Jan. 30, 1981, now U.S. Pat. No. 4,352,474 having the title of "Drag Control for Fishing Reels." The crank plate 21 may be selectively rotated in either a clockwise or counterclockwise direction as indicated by the double arrow 23. When it is desired to reel the fishing line 14 into the storage configuration on a spool 24, the crank plate is rotated in a clockwise direction by turning the knob 27 rotatably carried on the exterior surface of the crank plate 21. When it is desired to permit the reel or spool 24 to pay-out or advance the fishing line, the spool will move in a counterclockwise direction.

A drag adjuster mechanism is indicated in general by numeral 25 which is employed to selectively apply a braking action to the spool for adjusting the tension on the line 14. Adjustment of the drag mechanism is achieved by rotating a finger knob 26 which is coaxially disposed with respect to the winding knob 27 carried near the peripheral edge marginal region of the crank plate 21. The winding knob 27 is rotably carried on a yoke 28 which is fixed to the crank plate 21 by a suitable threadable arrangement and which is secured by a set screw 29.

Further details of the drag adjuster mechanism may be found in my copending application having Ser. No. 229,937 filed Jan. 30, 1981, with the title of "Drag Control for Fishing Reels."

A drive latch mechanism is carried in a housing 30 and is under the control of a rotatable screw 31 which permits the fisherman to select one of two positions for reel operation. In the first or slip position, the crank plate 21 is connected to the spool 24 only through the drag adjuster mechanism so that the spool is free to slip and is equivalent to a slip clutch type reel in function. When the control switch or screw 31 is in its second or positive position, a positive drive is provided which couples the crank plate 21 directly to the spool 24 so that when the crank plate is turned clockwise, the spool will turn clockwise under a direct or positive drive. However, under this latter condition, should a captured fish decide to pull or run, tension on the line 14 would cause the crank plate and the winding knob 27 to rotate in a counterclockwise direction which would, in a conventional reel, be dangerous. Therefore, a major feature of the present invention is to provide a disconnect mechanism for disconnecting the direct drive from the spool under this latter condition so that only the drag will be engaged with the spool in a slip-clutch type of procedure. The disconnect mechanism will be described in greater detail but does rely upon a spring biased release blade 32 which is pivotally mounted within a housing 33 carried on the frame 20.

Referring now in detail to FIG. 2, it can be seen that the frame 20 takes the form of a cage having a plate 34 on one side and a ring 35 on the opposite side arranged in fixed spaced apart relationship from the plate 34 by means of spacers such as spacer 36. Projecting into the area between the plate 34 and the ring 35, there is provided a stub shaft 37 integrally formed with the plate 34. A sleeve 40 is rotatably carried on the stub shaft 37 and the spool 24 is rotatably carried on the sleeve 40 via roller bearings on opposite ends of the spool such as roller bearing assembly 41.

One end of the sleeve 40 is threaded as noted by numeral 42 which receives the threaded bore of the crank plate 21 so as to be fixed thereto by the security locking mechanism 22. The opposite end of the sleeve 40 mounts a timing mechanism constituting a ratchet disk 43 having a notch 44. The ratchet disk 43 is fixed to the sleeve so as to rotate therewith when the crank plate 21 is rotated via the knob 27. However, the timing mechanism further includes a second ratchet disk 45 which includes a tooth 46 that is rotatably carried on the end of the sleeve 40 immediately adjacent to the plate 34 of the frame 20. The secondary ratchet disk 45 includes arcuate slots 47 and 48 into which pins 49 and 50 are inserted respectively and which translate rotary movement from the sleeve and primary disk 43 to limited movement of the secondary ratchet disk 45. A timing pawl 51 is pivotally carried on the inside of plate 34 of frame 20 by means of a screw 52 and the pawl includes a cam 53 which rides on the peripheral surface of the ratchet disk 45 and at selected times, on the periphery of the primary ratchet disk 43. It is to be understood that the diameter of the secondary ratchet disk 45 is larger than the diameter of the primary ratchet disk 43 and that for normal retrieval operation when the crank plate 21 is driven in a clockwise direction, the cam tooth 53 will normally ride on the surface 54 of the secondary ratchet disk. The pawl 51 is normally biased into engagement with the surface 54 by means of a spring 55 expanding between the frame 20 and the pawl 51. At a selected time, to be described later, the cam tooth 53 of the pawl 51 will ride on the surface 56 of the primary ratchet disk 43.

Disposed between the opposing surfaces of the primary ratchet plate 43 and the exterior surface of the spool, there is provided a friction disk 57 which is employed in the braking or drag procedure for controlling the tension on the fishing line 14. The friction disk 57 works in cooperation with a friction pad 58, shown in FIG. 3, that is carried on the end of the finger knob 26 of the drag adjuster mechanism 25. The pad 58 bears against the external surface of the opposite flange of the spool from the flange engaging friction disk 57 when the knob 26 is rotated so that the spool 24 moves slightly in a lateral direction so as to bear directly against the friction disk 57. In this manner, control of tension is directly under the user's fingers via knob 26. Inasmuch as knob 26 is adjacent to the winding knob 27, the user's hand need not be removed from the winding knob in order to adjust tension.

It can also be seen that the spool 24 includes side flanges 60 and 61 which are separated by a plurality of turns of fishing line 14 that are wrapped about a central core 62 having a central bore for insertably receiving the sleeve 40 and the bearing assemblies such as bearings 41. Also, it is to be particularly noted that side flange 61 includes a plurality of drive lugs 63 which are fixed thereto adjacent to the edge marginal region of the flange in fixed spaced apart relationship. Each of the lugs include a flat surface 64 and a sloping surface 65 which will be explained later during the discussion on direct drive of the spool by the crank plate 21.

Figures 3, 4, 15:
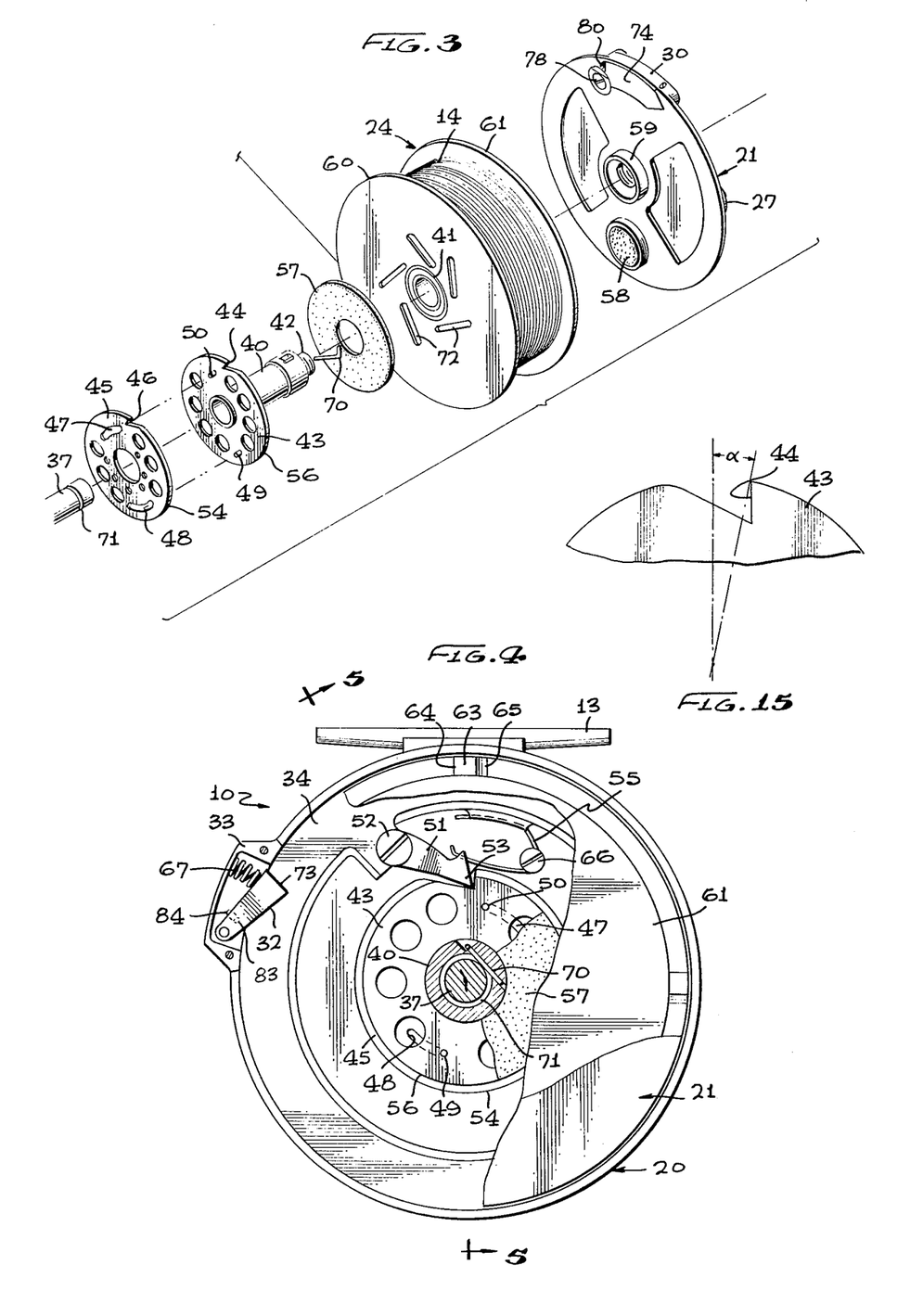
FIG. 3 is a view similar to the view of FIG. 2 as seen from the opposite side.
FIG. 4 is an enlarged fragmentary view of the novel fishing reel having portions broken away to expose the arrangement of component parts.
FIG. 15 is an enlarged view of a timing ratchet plate illustrating an angular cut of the notch therein.

Referring now in detail to FIG. 3, it can be seen that the inner face of crank plate 21 includes an integral collar 59 which is adapted to insertably receive the threaded end 42 of the sleeve 40 so that a fixed connection can be made by the security lock mechanism 22. Also, the terminating end of the collar 59 bears against the inner face of the bearing assembly 41 and thereby, it can be seen that the spool 24 will freely rotate on the sleeve 40. Also, FIG. 3 illustrates that the sleeve 40 is coupled to the stub shaft 37 via a pin 70 which is inserted through a hole in the sleeve 40 and is captured in an annular groove 71 provided in the stub shaft 37. Preferably, the pin 70 includes a portion which rests in a notch in the sleeve 40 and underlies the bearing assembly 41 so that the pin is retained in position. In this manner, the sleeve 40 will rotate on the stub shaft 37 and the pin 70 will ride through the groove 71 as rotation takes place. The extreme end of the sleeve 40 opposite to the end 42 carries the ratchet disk 43 in a fixed manner; however, immediately adjacent thereto, the secondary ratchet disk 45 is rotatably mounted thereon and is afforded limited movement between the opposite ends of the slots 47 and 48 when engaged by the pins 49 and 50 respectively.

It is to be noted that the exterior face of flange 60 of the spool 24 includes a plurality of angularly disposed grooves or channels such as is indicated by numeral 72 which serve as water receptacles for conducting any accumulation of moisture from within the reel as the spool is rotated. The length of each of the grooves or channels 72 is such as to terminate beyond the periphery of the clutch disk or brake disk 57 so that the accumulated water or moisture will be thrown away from the component parts and out of the frame 20. Also, through holes are bored in both 43 and 45 to dissipate water from the other surface of friction disc 57.

Referring now in detail to FIG. 4, it can be seen that the pawl 51 is pivotally carried on the frame plate 34 by the pivot screw 52. Also, the toothed cam 53 is normally biased into engagement with either one or both of the ratchet disk surfaces 54 and 56 by means of a bias spring 55 that is retained to the plate 34 by screw 66. It is to be particularly noted with reference to FIG. 15, that the notches 44 and 46 on disk 43 is angled in accordance with the double arrow showing of an angular displacement so that when the cam tip or tooth 53 engages with the top of the slot along edges 44 and 46, the pawl will be biased downwardly into the corner of the notches so that the pawl is automatically directed into a positive engagement with each of the respective notches.

It can also be seen that the blade 32 is automatically biased away from the frame and into the path of the drive latch 74 within limited movement as shown by pin 83 and slot 84 as the crank plate 21 rotates. Expansion spring 67 causes the blade to be normally biased into the path of the drive latch. When the crank plate 21 is rotated in a clockwise direction, the drive latch wipes across the sloping surface of the blade and causes the blade to pivot out of the way of the latch against the expansion tension of the spring 67. However, when the crank plate 21 is moved in a counterclockwise direction, the drive latch outside surface 74 wipes against the blade 32 causing the latch to move laterally into housing 30 and out of the way of the lugs 63 which are carried on the opposing flange 61 face of spool 24. If the blade 32 were to be omitted and did not wipe the drive latch laterally into housing 30 as in conventional reels when the fishing line 14 became tensioned by a captured fish so that the spool rotates in a counterclockwise direction, the lugs on the spool would bind against the drive latch and the crank plate would rotate in a counterclockwise direction causing the knob 27 to spin dangerously as described in the first part of the specification. However, by employing the blade to remove the latch from the path of the lugs, the spool is free to spin only against the drag as applied by the adjustable drag mechanism 25.

It is to be understood that a timing problem must be overcome in that the wiping blade is in a fixed position on the frame and counterclockwise tensioned rotation of the spool may occur at any location of the drive latch along its circular path with respect to the fixed blade. Therefore, the counterclcokwise rotation of the crank plate responsive to the counterclockwise rotation of the spool is effected for no more than a single revolution of the crank plate once the drive latch has been laterally moved into the housing 30 by the wiper blade 32. Further counterclockwise rotation of the crank plate and winding knob is prevented by engagement of the pawl 51 with the notches 44 and 46 on the ratchet wheel or disks 43 and 45. However, the aforementioned engagement is slightly delayed in order to prevent jamming and it is for this reason that the secondary ratchet wheel or disk 45 is provided and that the pawl 51 rides on the surface 54 thereof until the drive latch has been recessed within its housing. Such a timing mechanism is specifically shown with respect to the following figure description for FIGS. 6, 7 and 8.

Figure 6:
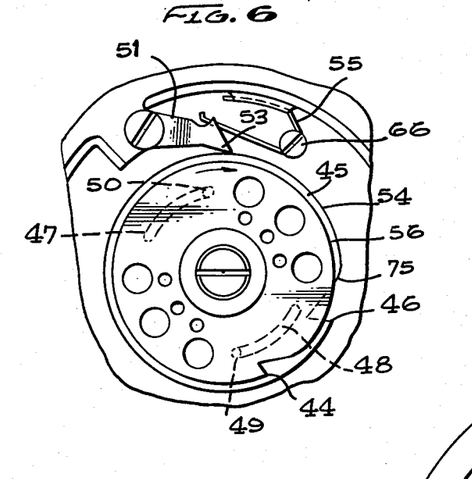
FIGS. 6, 7 and 8 are sequential views of the timing means employed in the disconnecting mechanism for releasing the winding crank plate from the spool.
Figure 7:
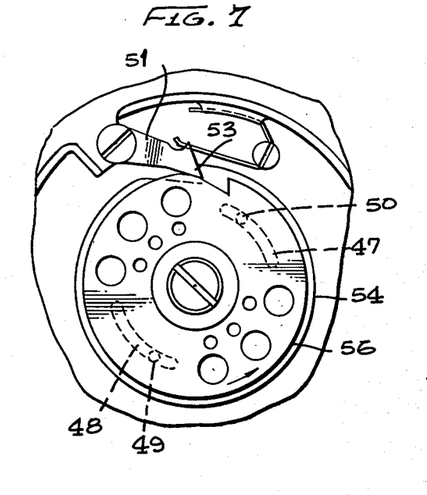
Figure 8:
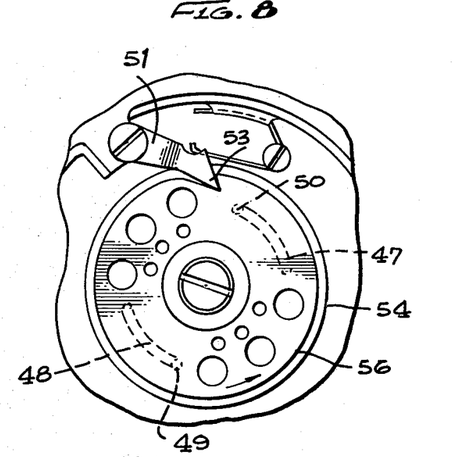

Referring now in detail to FIGS. 6, 7 and 8, it is to be noted that in FIG. 6, that pawl 51 rides on the secondary or larger diameter ratchet disk 45 during the normal reel in or fishing line retract procedure under positive drive. Shaft 40 and primary disk 43 rotate in a clockwise direction and pins 49 and 50 bear against the end of slots 47 and 48 in the secondary ratchet disk 45 to transmit the rotary force thereto. The cam 53 of the pawl 51 rides on surface 54 and drops slightly into the notch 46 as rotation continues. Then the pawl rides up hump 75 and onto the surface 54 again.

However, when the spool direction has been reversed to rotate in a counterclockwise direction and through the lugs and drive engagement causes the plate 21 to move in a counterclockwise direction, it is noted that the sleeve 40 will follow in a counterclockwise direction which causes the primary disk 43 to rotate in a counterclockwise direction and such movement removes the pins 49 and 50 from engagement with the ends of slots 47 and 48 as shown in FIG. 7. Such action causes a delay in aligning the notches 46 and 44 so that the pawl cannot drop into both notches at the same time.

In FIG. 8, counterclockwise direction has continued to the extent that the pins 49 and 50 are at the opposite end of the slots 47 and 48 and in this configuration, the pawl may now drop into engagement with both notches since the notches are coincidence. At this point in time, the disconnecting mechanism is complete for releasing the winding crank plate from the spool in that the blade has wiped the drive latch back into its housing and out of the way with the lugs 63 on the spool and rotation of the crank plate is prevented by engagement of the pawl with the notches in the ratchet disks so that the crank plate and its attendant winding knob 27 are at rest while the spool is rotating in a counterclockwise direction against the adjustable drag mechanism.

Figure 9:
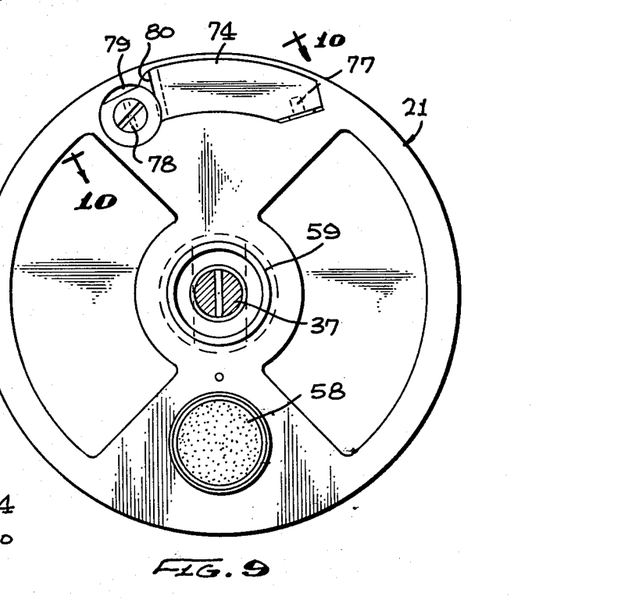
FIG. 9 is a sectional view of the fishing reel taken in the direction of arrows 9—9 of FIG. 5 illustrating portions of the disconnect mechanism and the drive assembly.
Figure 10:
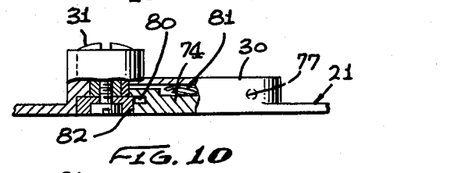
FIGS. 10 and 11 are enlarged plan views of the drive latch as taken in the directions of 10—10 of FIG. 9.
Figure 11:
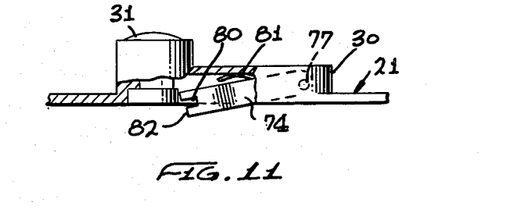

Referring now in detail to FIG. 9, it can be seen that drive latch 74 is pivotally carried on the crank plate 21 by means of pivot 77. The opposite end of the latch is releasably coupled to a retaining screw 78 having a locking flange 79 adapted to be rotated into or out of a groove 80 in the extreme end of the drive latch 74. When the retaining screw 78 has been rotated so that the flange 79 is incorporated into the slot as shown in FIG. 10, the drive latch is enclosed within the housing 30 and the latch is not in the path of the lug 63 carried on the flange of the spool 24. However, as shown in FIG. 11, when the turning screw 78 has been rotated such as by the selector control 31 to remove the locking flange 79 from the end slot 80, the expansion force of spring 81 forcibly urges or biases the drive latch 74 to pivot laterally so that its front face 82 outwardly projects from the side of crank plate 21 in position to butt or engage against the next lug 63 into which it comes in contact. Therefore, when the control 31 has been set to the positive drive position as shown in FIG. 14, the locking flange 79 is removed from slot 80 and the drive latch is in position for direct drive when the crank or knob 27 has been rotated to move the crank plate in a clockwise direction. When the latch is locked as shown in FIG. 10, the control is shown in the position of FIG. 13 and the reel is in the slip clutch position so that the only engagement between the crank plate 21 and the spool is via the adjustable drag mechanism.

However, during the condition when positive drive has been set on the control 31 and the latch is in engagement with the lugs 63 for direct driving, the fish may tension the line and run which will cause the spool to turn in a counterclockwise direction and cause the crank plate to rotate no more than one revolution in a counterclockwise direction as previously discussed. The object of the invention at this juncture is to reset the drive latch 74 into the housing 30 so it is out of the way and the disconnect mechanism for releasing the winding crank plate from the spool is effected.

Figure 12:
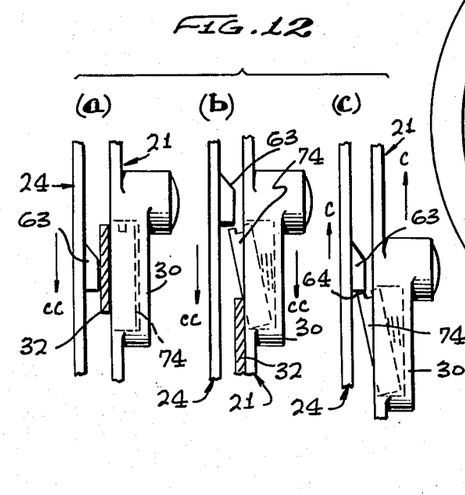
FIG. 12 is a top plan view of the direct drive latch illustrated in a sequence showing release by a release blade during the disconnect procedure in accordance with the timing sequence illustrated in FIGS. 6-8 inclusive.

To more clearly illustrate the latter positions, reference is now made to FIG. 12 wherein FIG. 12c shows the fishing line being positively retrieved by the winding crank since the drive latch 74 is outwardly projecting from the side of housing 30 and crank plate 21 into the path of the rotation of lugs 63. The flat surface 64 of the lug is engaged by the flat end 82 of the latch so that as the crank plate is turned in a clockwise direction, the spool is turned in a clockwise direction and the line is retrieved. However, should the fish put tension on the line and cause the spool to turn in a counterclockwise direction for a maximum of one revolution until such time as the blade 32 wipes across the side of the drive latch 74 as shown in FIG. 12b. This latter action causes the latch to pivot back into the housing 30 out of the way of the oncoming lug 63. In FIG. 12a, the blade is directly against the side of the latch and the lug 63 may pass thereby without any interference. The motion of the spool is in a counterclockwise direction and the crank plate 21 is not moving at all. Movement is prohibited by the disconnect mechanism which includes not only the wiping blade 32 but the ratchet and pawl mechanism shown in FIGS. 6, 7 and 8. The cessation of movement on crank plate 21 is achieved by pawl 52 engaging with the coinciding notches of the ratchet disk as previously described.

Figure 5:
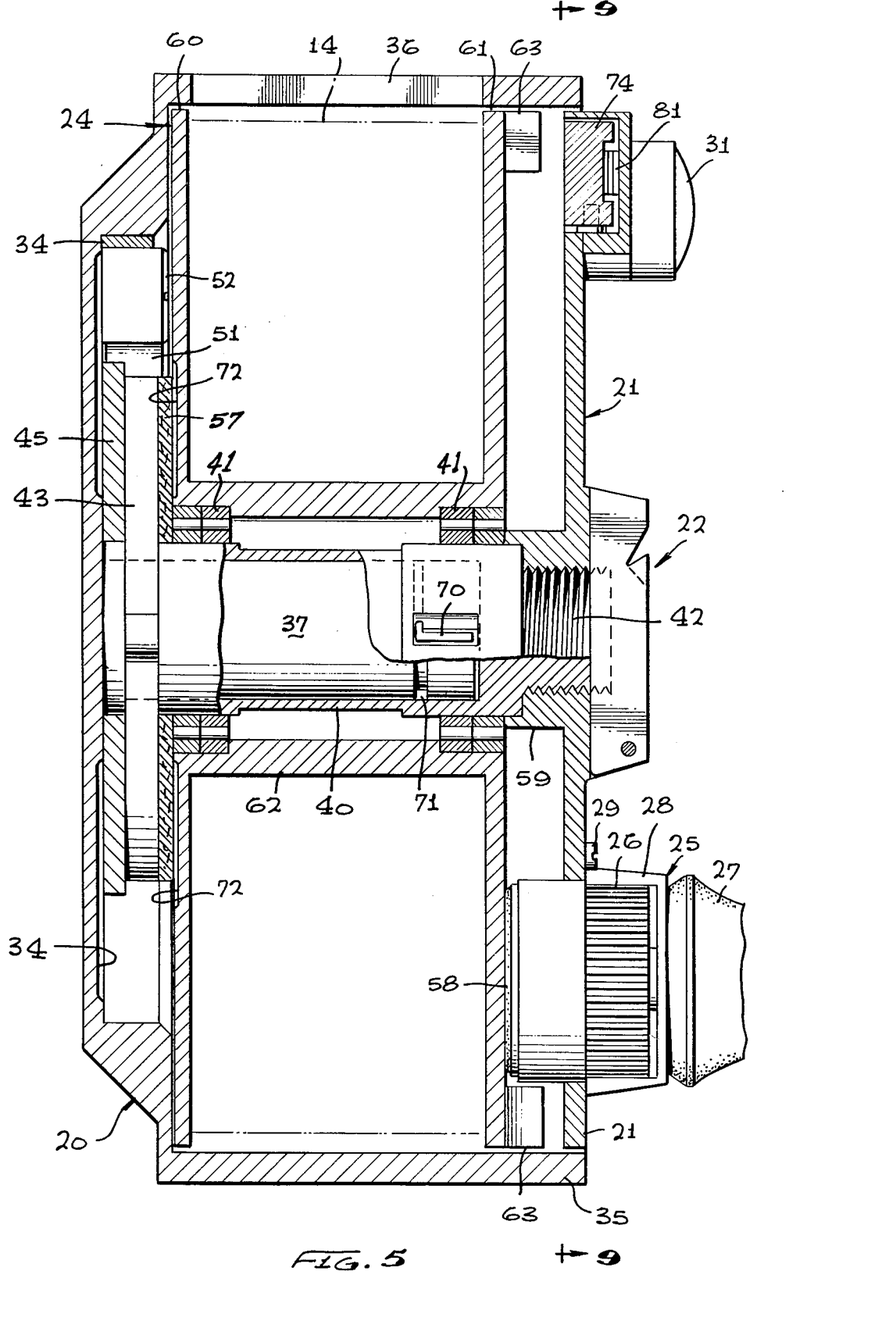
FIG. 5 is a transverse cross-sectional view of the novel fishing reel taken in the direction of arrows 5—5 of FIG. 4.

In FIG. 5, a cross-section of the fishing reel is illustrated and the relationship of the various parts shown in the exploded view of FIGS. 2 and 3 are placed together in a unit. Once assembled, it can be seen that the drive latch 74 may be selectively placed into and out of engagement with a respective lug 63 by rotation of the selector control 31. It can also be seen that the primary ratchet disk 43 is of a smaller diameter than the adjacent secondary ratchet disk 45 and that the adjustable drag mechanism includes the pad 58 bearing against the flange 61 of the spool 24 on one side of the spool and the friction plate or disk 46 bearing against the outside face of flange 60 of the spool 24. Water is passed through the channel 72 and through holes in disks 43 and 45 via centrifugal force and thrown from the frame as the spool spins on its bearings or by virtue of sleeve 30 rotation.

While particular embodiments of the present invention have been shown and described, it will be obvious to those skilled in the art that changes and modifications may be made without departing from this invention in its broader aspects by adapting this same disconnect feature to a standard, geared reel incorporating a common, ratcheted, over-running brake drag system and, therefore, the aim in the appended claims is to cover all such changes and modifications as fall within the true spirit and scope of this invention.

What is claimed is:

1. In a fishing reel having a spool for holding a length of fishing line which is rotatably carried with respect to a frame, the combination comprising:
   a winding means for driving said spool rotatably carried on said frame;
   drag means carried on said winding means for selective, applied tension engagement with said spool in a slip-clutch manner via said winding means in a first mode of operation;
   direct drive means cooperatively carried between said winding means and said spool for selective non-slip, positive drive of said spool in a second mode of operation;
   selector means carried on said winding means for actuating said direct drive means into or out of said second mode of operation;
   disconnect means operably carried between said frame and said winding means for disabling said direct drive means so that said spool rotates to the exclusion of rotation of said winding means against the applied tension of said drag means;
   said winding means includes a crank plate with an outwardly extending turning knob;
   said direct drive means includes a plurality of spaced apart lugs projecting laterally from said spool; and
   a resiliently mounted latch carried on said crank plate normally biased laterally onto abutting engagement with a selected one of said plurality of lugs when said direct drive means is in said second mode of operation.

2. The invention as defined in claim 1 wherein:
said disconnect means includes a blade pivotally carried on said frame and normally biased into an interference path with said direct drive means latch; and
said blade pivoted out of interference with said latch when said crank plate is rotated in clockwise direction and said blade operates to pivot said latch out of engagement with said lugs when said crank plate is rotated in counterclockwise direction.

3. The invention as defined in claim 2 wherein:
said selector means includes a manually operated stop having an operational position out of engagement with said latch permitting normal bias thereof into abuttment with a selected one of said lugs to establish said second mode of operation and a non-operative position engaging said latch in restraint against its bias to establish said first mode of operation.

4. The invention as defined in claim 3 wherein:
said disconnect means further includes a timing mechanism connected between said frame and said crank plate for preventing counterclockwise rotation of said crank plate for more than one revolution.

5. The invention as defined in claim 4 wherein:
said timing mechanism including a pair of ratchet disks attached to said crank plate and a pawl pivotally carried on said frame adapted to ride on the periphery of said ratchet discs;
each of said disks having a notch engagable by said pawl to prevent rotation of said crank plate; and
a selected one of said disks movable in relation to said other disk operably to delay engagement of said pawl with said notch in said non-selected disk to delay said direct drive means disablement.

6. In a fishing reel having a spool for holding a length of fishing line which is rotatably carried with respect to a frame, the combination comprising:
   a winding means for driving said spool rotatably carried on said frame;
   drag means carried on said winding means for selective, applied tension engagement with said spool in a slip-clutch manner via said winding means in a first mode of operation;
   direct drive means cooperatively carried between said winding means and said spool for selective non-slip, positive drive of said spool in a second in a second mode of operation;
   selector means carried on said winding means for actuating said direct drive means onto or out of said second mode of operation;
   disconnect means operably carried between said frame and said winding means for disabling said direct drive means so that said spool rotates to the exclusion of rotation of said winding means against the applied tension of said drag means; and
   means carried on said spool adjacent to said drag means for removing accumulation of moisture collected therebetween.

7. A fishing reel of the fly casting type comprising:
   a frame having a stub shaft outwardly projecting from the center of a plate;
   a winding means having a hollow sleeve projecting from the center thereof insertably receiving and rotating on said stub shaft;
   a spool for holding a length of fishing line rotatably carried on said winding means sleeve;

means for rotating said spool on said sleeve via said winding means;

drag means carried on said winding means for selective slip-clutch engagement with said spool in a first mode of operation to place a desired tension on said fishing line during a fish catching procedure;

a direct drive means cooperatively carried between said winding means and said spool for selective non-slip, positive drive of said spool in a second mode of operation;

a disconnect means operably carried between said winding means and said frame for disabling said direct drive means so that said spool rotates to the exclusion of rotation of said winding means against the applied tension of said drag means;

said drag adjuster mechanism includes a friction pad and rotary means for advancing and retracting said friction pad into and out of engagement with said spool; and said rotary means rotating on an axis parallel to and spaced apart from the rotating axis of said spool.

* * * * *